(12) United States Patent
Lin

(10) Patent No.: US 6,401,602 B1
(45) Date of Patent: Jun. 11, 2002

(54) MULTI-PURPOSE COOKING PAN

(76) Inventor: Shao Chiu Lin, PO Box 82-144, Taipei (TW)

(*) Notice: Subject to any disclaimer, the term of this patent is extended or adjusted under 35 U.S.C. 154(b) by 0 days.

(21) Appl. No.: 09/870,840

(22) Filed: Jun. 1, 2001

(51) Int. Cl.[7] .................. A23L 1/00; A47J 37/00; A47J 43/00; B65D 8/12; B65D 43/24
(52) U.S. Cl. .................. 99/339; 99/340; 99/345; 99/403; 99/417; 99/422; 99/447; 126/369; 126/377.1; 126/389.1; 220/912; 220/573.1
(58) Field of Search .................. 99/339, 340, 345–347, 99/403–417, 422–425, 444–450, 400, 401; 126/369, 369.1, 369.2, 377.1, 390.1, 389.1, 20; 220/912, 830, 827, 671, 203.03, 212.5, 366.1, 379, 369, 743, 573.1, 574.1

(56) References Cited

U.S. PATENT DOCUMENTS

| | | | | |
|---|---|---|---|---|
| 899,244 A | * | 9/1908 | Chase | 99/412 |
| 1,214,992 A | * | 2/1917 | Boleratz | 99/412 |
| RE16,011 E | * | 3/1925 | Simon | 99/412 |
| 2,081,751 A | * | 5/1937 | Lendrum et al. | 99/412 |
| 3,808,963 A | * | 5/1974 | Ludena et al. | 99/417 |
| 4,164,174 A | * | 8/1979 | Wallsten | 99/415 |
| 4,401,017 A | * | 8/1983 | Feld | 99/413 |
| 4,462,308 A | * | 7/1984 | Wang | 126/369 X |
| 4,604,989 A | * | 8/1986 | Kita | 220/377 X |
| 4,739,698 A | * | 4/1988 | Allaire | 99/417 |
| 5,287,798 A | * | 2/1994 | Tkaeda | 99/413 |
| 5,584,235 A | * | 12/1996 | DuBois et al. | 126/369 X |
| 5,816,139 A | * | 10/1998 | Scorta Paci | 99/410 X |

* cited by examiner

Primary Examiner—Timothy F. Simone
(74) Attorney, Agent, or Firm—A & J

(57) ABSTRACT

A multipurpose cooking pan has an outward top flange round the top open side thereof, slots and holes on the outward top flange for guiding external heat energy into the inside of the cooking pan during cooking, an endless positioning groove on the outward top flange for the positioning of the pan cover covering the cooking pan, and at least one sloping guide notch cut through a part of the outward top flange for enabling liquid means to be guided out of the cooking pan when the user tilting the cooking pan.

2 Claims, 4 Drawing Sheets

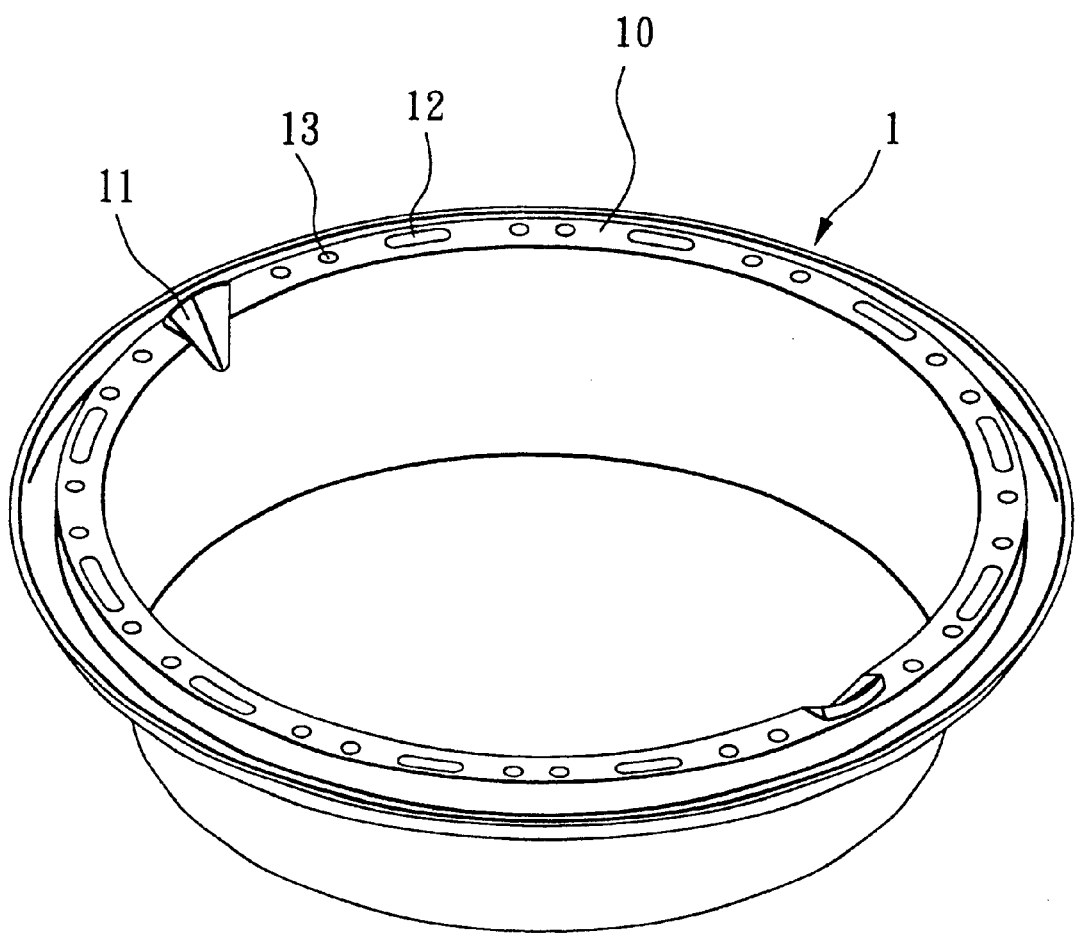
F I G. 1

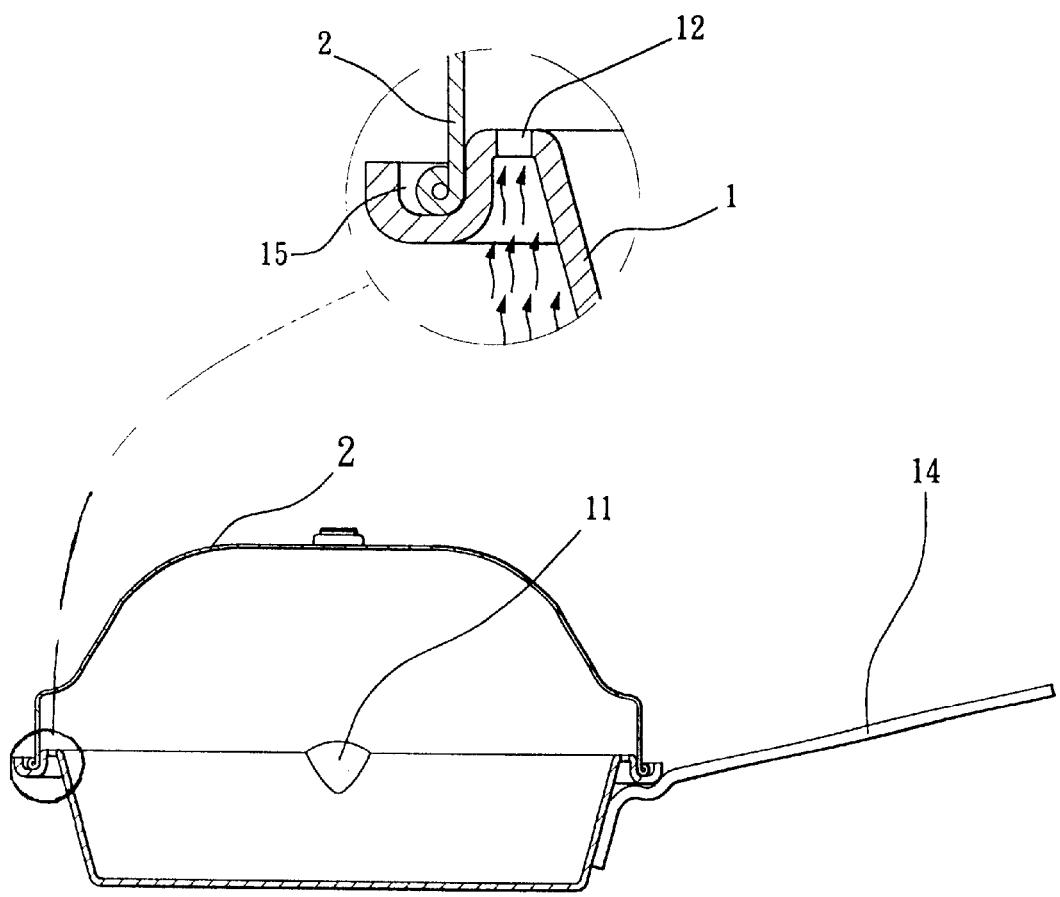
F I G. 6

MULTI-PURPOSE COOKING PAN

BACKGROUND OF THE INVENTION

The present invention relates to a kitchen utensil and, more particularly, to a multipurpose cooking pan, which prevents escaping of steam during cooking when covered with a pan cover, has means for guiding out residual cooking oil to an external container after cooking.

A variety of cooking pans, woks, pots, and cookers are commercially available for use to cook food. When using a cooking pan to cook food, steam may escape out of the cooking pan through the gap between the pan and the pan cover, and the good smell of the food under cooking will be carried away with escaping steam. When using a cooking pan to cook food, a part of the heat energy of the heat source heating the cooking pan passes over the outside wall of the cooking pan to the outside open air, i.e., much heat energy is wasted and not fully utilized. Further, when pouring residual cooking oil from a cooking pan to an external container after cooking, it is difficult to guide residual cooking oil accurately into the external container, and residual cooking oil may be sprayed over the surroundings outside the external container.

SUMMARY OF THE INVENTION

The present invention has been accomplished to provide a multipurpose cooking pan, which eliminates the aforesaid drawbacks. It is the main object of the present invention to provide a multipurpose cooking pan, which has slots and holes for convection of heat to improve the cooking efficiency. It is another object of the present invention to provide a multipurpose cooking pan, which has means to receive the pan cover in a tight condition, preventing dissipation of good smell of the food under cooking. It is still another object of the present invention to provide a multipurpose cooking pan, which has means for guiding residual cooking oil out of the cooking pan to an external container when the user tilts the cooking pan. It is still another object of the present invention to provide a multipurpose cooking pane, which is practical for stewing a chicken or duck, as well as for frying vegetables and meat. The multi multipurpose cooking pan of the invention comprises an outward top flange round the top open side thereof, slots and holes on the outward top flange for guiding external heat energy into the inside of the cooking pan during cooking, an endless positioning groove on the outward top flange for the positioning of the pan cover covering the cooking pan, and at least one sloping guide notch cut through a part of the outward top flange for enabling liquid means to be guided out of the cooking pan when the user tilting the cooking pan.

BRIEF DESCRIPTION OF THE DRAWINGS

FIG. 1 is a perspective view of a cooking pan constructed according to the present invention.

FIG. 3A is an enlarged view of a part of FIG. 3.

FIG. 4A is an enlarged view of a part of FIG. 4.

FIG. 6 is a plain view of the present invention showing the cooking pan fixedly provided with a handle and covered with a pan cover.

FIG. 6A is an enlarged view of a part of FIG. 6, showing heat energy flows upwards through one slot of the outward top flange of the cooking pan.

DETAILED DESCRIPTION OF THE PREFERRED EMBODIMENT

Figures 2, 3:
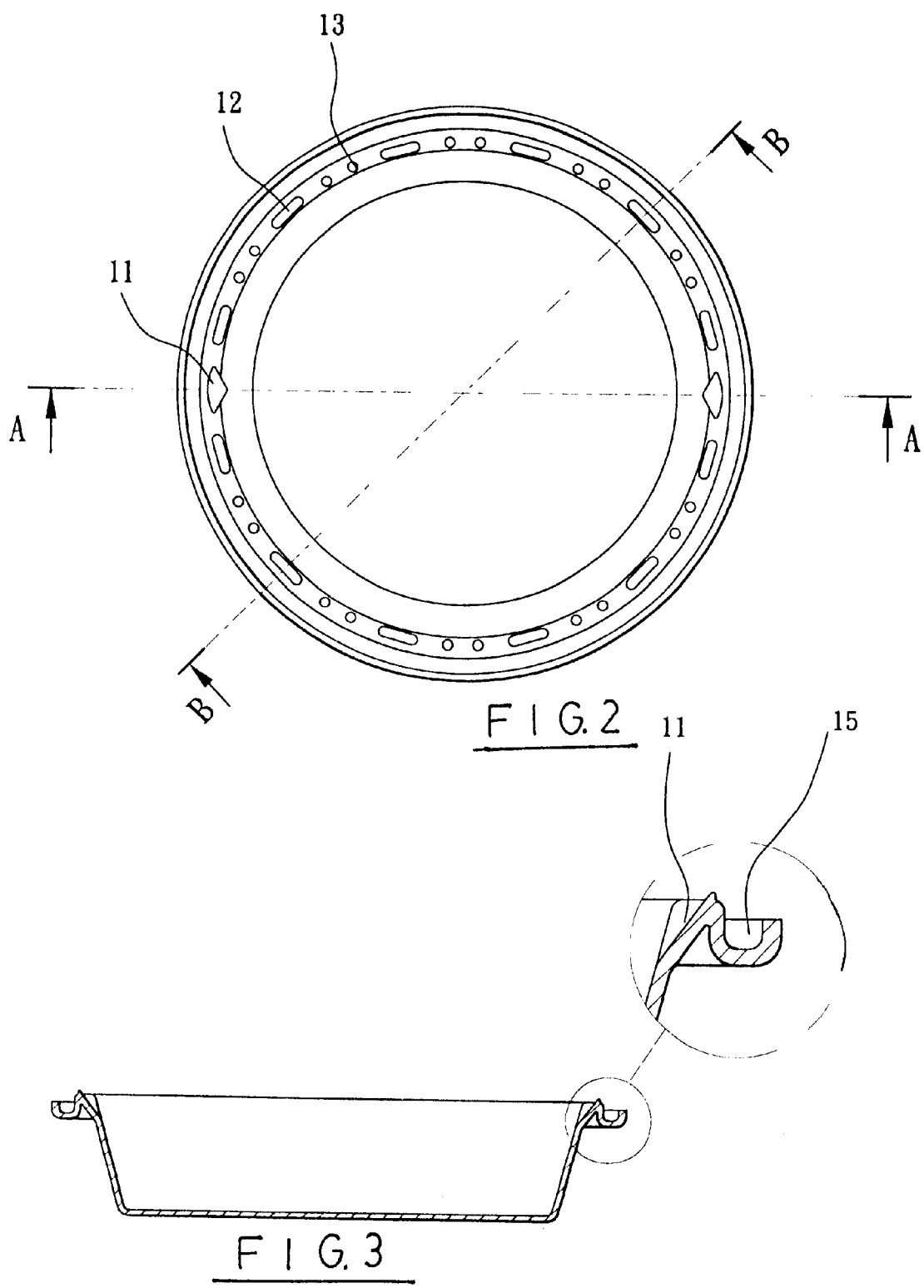
FIG. 2 is a top plain view of the cooking pan shown in FIG. 1.
FIG. 3 is a sectional view taken along line A—A of FIG. 2.
Figure 4:
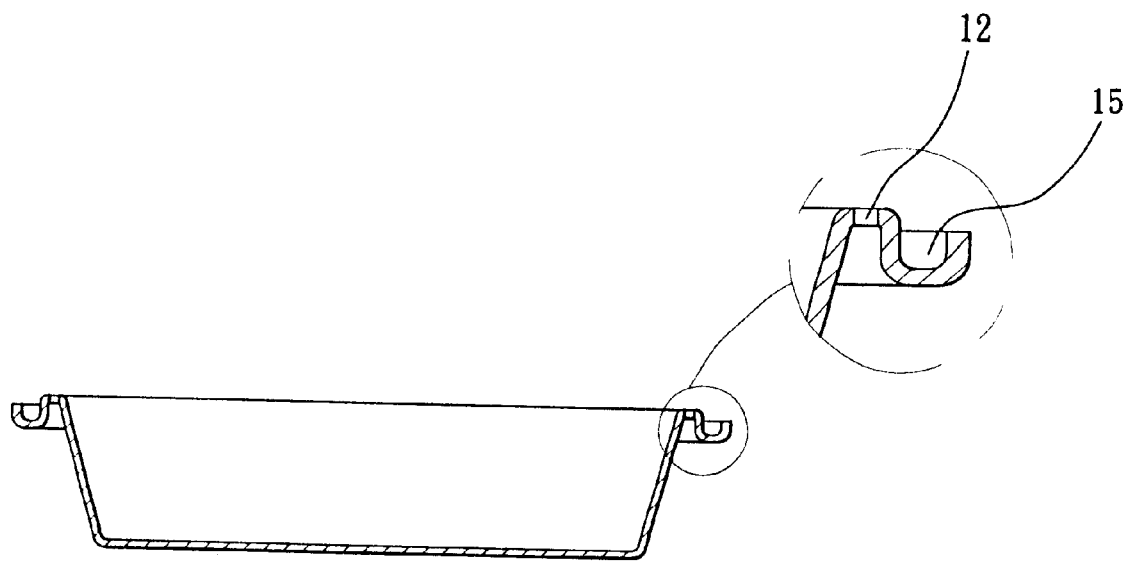
FIG. 4 is a sectional view taken along line B—B of FIG. 2.

Referring to FIGS. 1 through 4, the multipurpose cooking pan 1 of the invention is a top-open vessel comprising an outward top flange 10 extended outwards from the periphery of the top open side thereof. The outward top flange 10 comprises multiple oblong slots 12 and pairs of holes 13 alternatively spaced around the periphery of the cooking pan 1, and an endless top positioning groove 15 surrounding the oblong slots 12 and pairs of holes 13 for the positioning of a pan cover 2 (see FIG. 6).

The cooking pan 1 further comprises at least one guide notch 11 cut through a part of the outward top flange 10 and sloping downwardly inwards from the outward top flange 10 toward the inside of the cooling pan 1. The guide notch 11 is shaped like a triangular cone having a wider upper side and narrower lower side. When tilting the cooking pan 1, residual oil can be poured out of the cooking pan 1 to an external container (not shown) through one guide notch 11. Further, at least one handle 14 is fixedly fastened to the outside wall of the cooking pan 1 for the holding of the hand. (see FIG. 6).

When cooking, the pan cover 2 is covered on the cooking pan 1 and positively positioned in the endless top positioning groove 15. During cooking, the heat source directly heats the bottom side of the cooking pan 1, and a part of the heat energy of the heat source which escapes out of the bottom side of the cooking pan 1 flows upwards through the oblong slots 12 and pairs of holes 13 to the inside of the cooking pan 1 to enhance the temperature inside the cooking pan 1, causing the food to be quickly cooked.

Further, when steam is condensed into water during cooking, condensed water will move along the inside wall of the pan cover 2 to the endless top positioning groove 15 to seal the gap between the cooking pan 1 and the pan cover 2, preventing dissipation of the good smell of the food under cooking.

Figure 5:
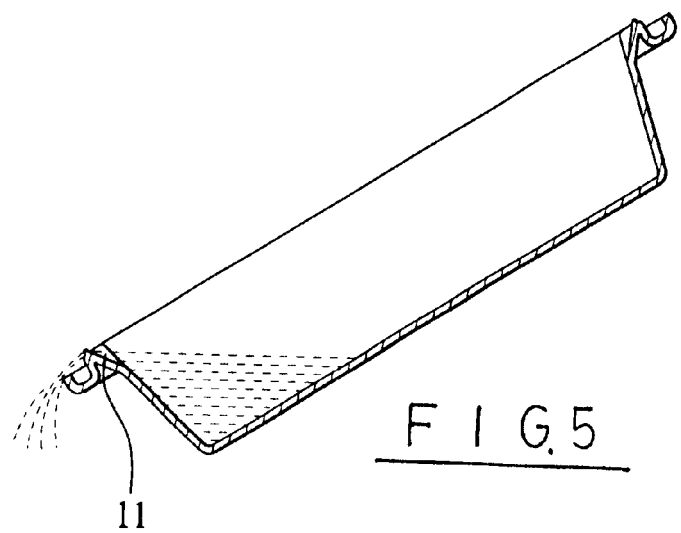
FIG. 5 is a sectional view of the present invention showing the cooking pan tilted, residual oil guided out of the cooking pan through one guide notch of the cooking pan.

A prototype of multipurpose cooking pan has been constructed with the features of FIGS. 1–6. The multipurpose cooking pan functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A multipurpose cooking pan comprising an outward top flange extended outwards from the periphery of a top open side thereof, a plurality of slots and holes respectively cut through said outward top flange and spaced around the periphery of the cooking pan, and an endless top positioning groove extended on a top surface of said outward top flange surrounding said slots and holes for the positioning of a pan cover.

2. The multipurpose cooking pan of claim 1 further comprising at least one guide notch cut through a part of said outward top flange and sloping downwardly inwards from said outward top flange toward the inside of the cooling pan for enabling liquid means to be guided out of the cooking pan when the user tilting the cooking pan.

* * * * *